United States Patent Office 3,634,425
Patented Jan. 11, 1972

1

3,634,425
INSECTICIDAL AND ANTHELMINTIC 2-ALKOXY-
QUINOXALINYL PHOSPHATES
Richard Joseph Magee, Princeton, N.J., assignor to
American Cyanamid Company, Stamford, Conn.
No Drawing. Filed July 30, 1969, Ser. No. 846,260
Int. Cl. C07d 51/78
U.S. Cl. 260—250
3 Claims

ABSTRACT OF THE DISCLOSURE

The 2-alkoxyquinoxalinyl phosphorothioates of Figure I are useful in controlling inserts and arachnids and are anthelmintic agents:

Figure I

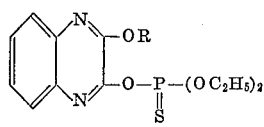

wherein R is a lower alkyl group of 1 to 4 carbon atoms.

This invention relates to novel compounds and compositions of matter which are useful for controlling insects and arachnids and also for the removal of helminths from warm-blooded animals. More particularly, it relates to quinoxalinyl compounds having the formula of Figure I wherein R is a lower alkyl group of 1 to 4 carbons and compositions containing said compounds which are useful for controlling insects and arachnids through direct contact or application to their habitat or by application to crops or to soil in which crops are planted and which are further useful in removing helminths from warm-blooded animals by oral administration or by other means.

Suitable quinoxalinyl compounds contemplated by the present invention are, for example, O,O-diethyl 3 - methoxy - 2 - quinoxalinyl phosphorothioate, O,O - diethyl 3 - ethoxy - 2 - quinoxalinyl phosphorothioate, O,O - diethyl 3 - propoxy - 2 - quinoxalinyl phosphorothioate and O,O - diethyl 3 - sec - butoxy - 2 - quinoxalinyl phosphorothioate. These compounds can conveniently be prepared by reacting the known compound, 2,3 - dichloro quinoxaline with sodium hydroxide to form 3-chloro-2(1H)-quinoxalinone which is in turn reacted with sodium alkoxide to produce a 3 - alkoxy - 2(1H) - quinoxalinone which is in turn reacted with potassium t-butoxide

2 and diethyl chlorothiophosphate as shown in the reaction scheme below:

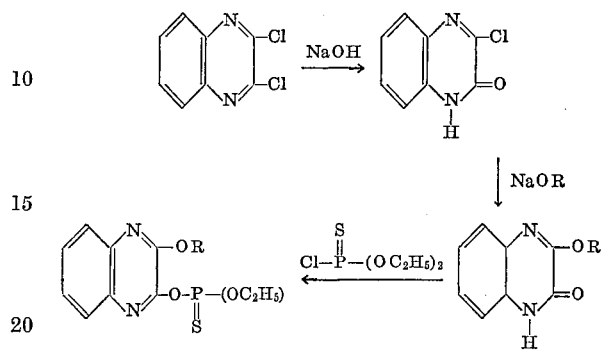

INSECTICIDAL APPLICATIONS

For insecticidal and arachnicidal activity, the quinoxalinyl phosphates of the present invention can be applied as solids or in the form of liquid sprays either in conventional low volume type formulations or as ultra-low volume application.

Solid formulations can be prepared by dissolving the active compound in a solvent, generally a relatively volatile organic solvent, such as xylene, cyclohexanone, a lower alcohol or the like, spraying the solution onto an agitated bed of inert solid carrier, such as attapulgite, kaolin, talc or diatomaceous earth in granular or finely ground form, and, thereafter, drying the thus-prepared formulation. An emulsifier, such as an alkylaryl sulfonate, alkylaryl polyglycol ether and polyalkylene fatty acid esters, are generally advantageously employed in the preparation of wettable powders, where such powders are to be diluted with water before spraying. Suitable formulations generally contain from about 25% to 95%, by weight, of the quinoxalinyl toxicant in the inert carrier.

In general, suitable liquid sprays can be prepared as concentrates by dissolving the toxicant in an organic solvent, such as, for example, xylene, benzene, lower alcohol, fuel oil, or the like, with or without an emulsifying agent. For application the resulting solutions can be further diluted with either water or an organic diluent, such as deodorized kerosene. Concentrations in the range of from about 20% to about 95% are generally suitable for the initial solutions. When diluted for application suitable solutions may contain as little as 0.01% of the active toxicant.

The toxicant of the present invention may also be applied with a small amount of an essentially non-evaporating solvent, such as the high aromatic solvents (many 5% or better aromatics), having a flash point above about 125° F., such as "Panasol" or "Socal 44L." The mixture is applied as such at very low rates (i.e., about 1 to 32 fluid ounces per acre).

Advantageously, the compounds of the invention have activity against a wide variety of economically important plant pests. Moreover, they are highly effective as either contact or systemic pesticides and are outstanding for the control of soil insects and provide excellent control of both the larval and adult stages of both insects and arachnids. Additionally, it has been observed that the compounds of the invention are non-phytotoxic at pesticidally effective concentrations.

ANTHELMINTIC APPLICATIONS

The compounds of the present invention may be used to remove helminths from warm-blooded animals either by means of a short-term therapeutic course, for example, lasting a single day, or in a long-term course, such as in a prophylactic diet, lasting for a week or more. In the first case, dosages of from about 5 to about 100 milligrams per kg. of body weight are generally effective. In the second case the range of dosage per day of from about 10 to about 200 mg. per kg. of body weight is generally effective. The compounds may be administered by gavage, for example, in agar suspension, or mixed with a suitable excipient and prepared in the form of a capsule or tablet by conventional procedures, for oral use. The compounds can also be advantageously employed by administering them mixed with animal feed.

The invention is further illustrated by the following examples. Unless otherwise indicated all parts and percentages are by weight.

EXAMPLE 1

Preparation of 3-chloro-2(1H)-quinoxalinone 2,3-dichloroquinoxaline (41.8 g., 0.21 mole) is added to sodium hydroxide (16.8 g., 0.42 mole) in a mixture of 400 cc. of 1,4-dioxane and 225 cc. of water. The reaction mixture is heated and stirred at 70–80° C. for a period of about 1 hour. An additional 250 cc. of water are added and the heating is continued for 30 minutes. The reaction mixture is diluted with 3.5 liters of water. The resulting solution is filtered to remove any solids present and the filtrate is acidified with concentrated hydrochloric acid until a pH of 4 is established. The desired product precipitates from solution and is collected by suction filtration and dried in a vacuum oven at 40° C.

EXAMPLE 2

Preparation of 3-methoxy-2(1H)-quinoxalinone 3-chloro-2-quinoxalinol (19.8 g., 0.0110 mole) are added to an alcohol solution of sodium methoxide, which is prepared by adding 5.0 g. of sodium metal to 250 cc. of methanol. The resulting solution is stirred under reflux for a period of 2¼ hours and allowed to stand overnight at room temperature. One liter of water is then added and the resulting solution is acidified with concentrated hydrochloric acid to a pH of 7. The solids are removed by filtration and the desired product is recovered by evaporation of the filtrate. The crystalline product is purified to two recrystallizations from dimethylformamide to produce 12.3 g. of product having a melting point of from 243 to 245° C.

EXAMPLE 3

Preparation of O,O-diethyl 3-methoxy-2-quinoxalinyl phosphorothioate 3-methoxy-2(1H)-quinoxalinone (4.63 g., 0.0263 mole) is dissolved in 150 cc. of dimethylsulfoxide (DMSO) containing 3.14 g. (0.028 mole) of potassium t-butoxide. The reaction mixture is stirred for three minutes at room temperature and then cooled to about 0° C. on an ice bath. Diethyl chlorothiophosphate (4.9 g., 0.026 mole) is then rapidly added to the cooled solution. The mixture is stirred for a period of about five minutes and then added to a mixture of 200 cc. of ice water and 150 cc. of methylene chloride. After mixing, the methylene chloride layer is separated and the aqueous layer is extracted with an additional 150 cc. of methylene chloride. The combined methylene chloride layers are washed with 200 cc. of water. The resulting methylene chloride layer is dried over anhydrous magnesium sulfate and the methylene chloride is removed by evaporation. 100 cc. of hexane are heated to 80° C. and added to the resulting oil. The unreacted 3-methoxy-2-quinoxalinol is removed by filtration. The desired product is recovered from the filtrate by evaporation of the hexane.

EXAMPLE 4

The insecticidal activity of the compounds of the invention is illustrated by the following tests. The procedures employed and te results obtained are set forth below.

Bean aphid—*Aphis fabae* Scopoli

Compounds are tested as 0.1%, 0.01%, and 0.001% solutions or suspensions in 65% acetone/35% water. Two-inch fiber pots, each containing a nasturtium plant two inches high and infested with about 150 aphids two days earlier, are sprayed with test solution to give complete coverage of the aphids and the plants. The sprayed plants are laid on their sides on white enamel trays which have had the edges coated with No. 50 SAE oil as a barrier. Mortality estimates are made after holding for two days at 70° F., and 50% R.H.

Southern armyworm—*Prodenia eridania* Cramer

The 0.1% and 0.01% solutions from the aphid test are also used for this test. Sieva lima bean primary leaves are dipped for three seconds in the test solution and set in a hood on a screen to dry. When dry, each leaf is placed in a four-inch petri dish which has a moist filter paper in the bottom and ten third-instar armyworm larvae about ⅜" long. The dishes are covered and held at 80° F., and 60% R.H. After two days, mortality counts and estimates of the amount of feeding are made. Compounds showing partial kill and/or inhibition of feeding are held an extra day for further observations.

Two-spotted spider mite—*Tetranychus urticae* (Koch)

Sieva lima bean plants with primary leaves three to four inches long are infested with about 100 adult mites per leaf four hours before use in this test. The mite and egg infested plants are dipped for three seconds in the 0.1%, 0.01% and 0.001% solutions used in the aphid test, and the plants set in a hood to dry. They are held for two days at 80° F., 60% R.H., and the adult mite mortality estimated on one leaf under a stereoscopic microscope. The other leaf is left on the plant an additional five days and then examined at 10× power magnification to estimate the kill of eggs and of newly-hatched nymphs, giving a measure of ovicidal and residual action, respectively.

Confused flour beetle—*Tribolium confusum* Jacquelin duVal

Compounds are formulated at 1% dusts by mixing 0.1 part of the compound with 9.9 parts of talc, wetting with 5 parts (by volume) of acetone and grinding with a mortar and pestle until dry. 125 mg. of this 1% dust are then blown into the top of a dust settling tower with a short blast of air. The dust is allowed to settle on four-inch petri dishes for two minutes, giving a deposit of aproximately 87 mg./sq. foot of the 1% dust. The dishes are removed and 25 adult confused beetles are added immediately. The dishes are held for three days at 80° F. and 60% R.H. following which mortality counts are made. The test is repeated after the further addition of talc to produce a 0.1% formulation.

Large milkweed bug—*Oncopeltus fasciatus* Dallas

The 1% dusts described above are used in this test. 25 mg. of the 1% dusts are sprinkled evenly over the glass bottom of a seven-inch diameter cage giving a deposit of approximately 94 mg./sq. foot of the 1% dust. Water is supplied in a two-ounce bottle with a cotton wick, twenty adult bugs are added and a screen cover placed on the top. Mortality counts are made after holding for three days at 80° F. and 60% R.H.

German cockroach—*Blattella germanica* (Linnaeus)

The procedure is the same as for the large milkweed bug test, except that in this test only adult males are used.

Systemic tests

The compound to be tested is formulated as an emulsion containing 0.1 gram of test material, 0.2 gram of Alrodyne 315 emulsifier, 10 ml. of acetone and 90 ml. of water. This is diluted ten-fold with water to give a 100 p.p.m. emulsion for the initial test. A sieve lima bean plant with only the primary leaves unfolded is cut off just above soil level and inserted into a two ounce bottle of 100 p.p.m. emulsion and held in place by a bit of cotton wrapped around the stem. The botttle is then placed in a ventilated box with the leaves extending outside the box, such that any possible fumes from the compound will be drawn out the end of the box rather than rising to affect the test leaves. About 50 adult two-spotted spider mites are placed on each leaf. After holding three days at 80° F. and 60% R.H., mortality estimates are made and one leaf from each plant is placed on a moist filter paper in the bottom of a petri dish. Ten third-instar southern armyworn larvae are added to each dish and mortality counts made after holding another three days at 80° F. and 60% R.H. The test is repeated after a further 10 fold dilution using a 10% aqueous solution of acetone.

Common malaria mosquito larvae—*Anopheles quadrimaculatus* Say

Groups of 25 larvae of the common malaria mosquito are transferred with a medicine dropper to a 50 ml. beaker containing 25 ml. of water. The test compound is formulated as an emulsion containing 0.1 gram of test material, 0.2 gram of Alrodyne 315 emulsifier, 10 ml. of acetone and 90 ml. of water. This 1000 p.p.m. emulsion is diluted ten-fold with 65% acetone—35% water to give 100 p.p.m. One milliliter of the 100 p.p.m. emulsion is pipetted into 225 ml. of water in a 400 ml. beaker and stirred vigorously. The larvae in 25 ml. of water are added, giving a concentration of 0.4 p.p.m. Mortality counts are made after 24 hours at 80° F. The compounds are further tested at 0.1 p.p.m.

Housefly—*Musca domestica* Linnaeus

Groups of 25 adult female houseflies are lightly aesthetized with carbon dioxide, placed in wide-mouth pint mason jars, and covered with a screen cap. The test compound is formulated as emulsions containing 50 p.p.m. and 5 p.p.m. of test material, an emulsifier, acetone, and water. The mouth of the vial is covered with a single layer of cheesecloth, inverted and placed on the screen cap so that the flies can feed on the solution through the screen. Mortality counts are made after two days at 80° F.

Southern corn rootworm—*Diabrotica undecimpunctata howardi* Barber

The compound in test is formulated as a dust and incorporated into the soil at the equivalents of 50 and 10 pounds per acre (p.p.a.). The soil is subsampled into bottles, and ten 6- to 8-day old rootworm larvae added to each bottle, which is then capped. Mortality counts are made after six days at 80° F., 60% R.H.

False wireworm—*Eleodes suturalis* Say

The test is the same as with the rootworms except that 10-day old wireworm larvae are used.

Boll weevil—*Anthonomus grandis* Boheman

Test compounds are prepared as 100 p.p.m. solutions in 10% acetone, 0.2% Alrodyne 315, and 89.8% water. The first or second true leaf of young cotton plants is dipped for 3–5 seconds in the test solution and placed in an exhaust hood to dry. When dry, each leaf is placed in a 4-inch petri dish with a moist filter paper on the bottom. Ten adult boll weevils are removed from the stock culture and placed in the petri dish. The dishes are covered and held at 80° F. and 60% R.H. After 2 days, mortality counts are made.

Tobacco budworm—*Heliothis virescens* Fabricius

Test compounds are prepared as 0.1% and 0.01% solutions in 65% acetone and 35% water. Primary leaves, only ¼ fully developed, are dipped for 3–5 seconds in the test solutions and placed in an exhaust hood to dry. When dry, each leaf is placed in a one-ounce plastic medicine cup containing one dental wick saturated with water and two 3rd instar tobacco budworms. The cup is capped and held at 80° F. and 60% R.H. After 2 days, mortality counts are made.

TABLE I

| Compound | Bean aphid | | | Southern armyworm | | Spider mite | | | Confused flour beetle | | M.B.[1] | G.C.[2] |
|---|---|---|---|---|---|---|---|---|---|---|---|---|
| | 0.1% | 0.01% | 0.001% | 0.1% | 0.01% | 0.1% | 0.01% | 0.001% | 1.0% | 0.1% | 1.0% | 1.0% |
| 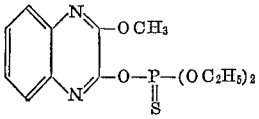 | 100 | 100 | 100 | 100 | 100 | 100 | 100 | 100 | 100 | 100 | 50 | 100 |
| 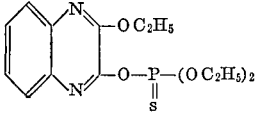 | 100 | 100 | 65 | 100 | 100 | 100 | 100 | 100 | 100 | (3) | 20 | 65 |

[1] Large milkweed bug, *Oncopeltus fasciatus* Dallas.
[2] German cockroach, *Blattella germanica* Linnaeus.
[3] Not tested.

TABLE II

| Compound | Systemic spider mite 100 p.p.m. | Systemic southern armyworm 10 p.p.m. | Systemic southern armyworm 100 p.p.m. | Mosquito larvae 0.4 p.p.m. | Mosquito larvae 0.1 p.p.m. | Housefly 50 p.p.m. | Housefly 5 p.p.m. | Rootworms 50 p.p.a. | Rootworms 10 p.p.a. | Wireworms 50 p.p.a. | Wireworms 10 p.p.a. | Boll weevil 100 p.p.m. | Budworm 0.1 percent | Budworm 0.01 percent |
|---|---|---|---|---|---|---|---|---|---|---|---|---|---|---|
| quinoxalinyl-OCH₃, O-P(OC₂H₅)₂ =S | 100 | 52 | 100 | 100 | 100 | 100 | 100 | 100 | 100 | 100 | 100 | 100 | 95 | 30 |
| quinoxalinyl-OC₂H₅, O-P(OC₂H₅)₂ =S | (¹) | (¹) | (¹) | 100 | 100 | 62 | 100 | 100 | 45 | 100 | 100 | 100 | 20 | 10 |

EXAMPLE 5

The anthelmintic activity of the compounds of the invention is illustrated by the following tests. The procedure employed and the results obtained are set forth below.

Six seven-week old female Swiss white mice are experimentally inoculated with tapeworks (*Hymenolepis nana*) and roundworms (*Aspiculuris tetraptera*). The drug O,O-diethyl 3-methoxy-2-quinoxalinyl phosphorothioate is administered 21 days after inoculation. The mice are dosed wtih the drug in agar water suspension and are necropsied three or four days after oral dosing at which time the intestines are searched for parasites. Ten or more untreated controls are necropsied to determine the helminth burdens present.

The results of these tests, shown in the table below, demonstrate high acivity at nontoxic oral doses.

TABLE III

| Dose mg./kg.[a] | Treated group, number mice positive/total H.n. | Treated group, number mice positive/total A.t. | Control group, number mice positive/total H.n. | Control group, number mice positive/total A.t. | Control Avg. No. H.n. | Control Avg. No. A.t. | Group Median No. |
|---|---|---|---|---|---|---|---|
| 50 | 0/4 | 0/4 | 14/18 | 17/18 | | | <8 |
| 20 | | 0/4 | | 19/20 | | | >8 |
| 20 | 0/5 | | 7/10 | | 26.8 | | |
| 0 | [b]1/5 (1) | 0/5 | 13/14 | 11/14 | 10.2 | | <8 |

[a] Mg. of drug per kg. of body weight.
[b] Only one tapeworm in one mouse.

I claim:

1. A compound of the formula:

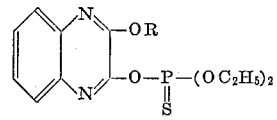

wherein R is a lower alkyl group.

2. The compound according to claim 1: O,O-diethyl 3-methoxy-2-quinoxalinyl phosphorothioate.

3. The compound according to claim 1: O,O-diethyl 3-ethoxy-2-quinoxalinyl phosphorothioate.

References Cited

UNITED STATES PATENTS

3,040,046  6/1962  Sasse et al. _____ 260—250 R

FOREIGN PATENTS

1,085,340  9/1967  Great Britain _____ 260—250

NICHOLAS S. RIZZO, Primary Examiner

U.S. Cl. X.R.

424—250